United States Patent
Biagini et al.

(10) Patent No.: US 11,939,427 B2
(45) Date of Patent: *Mar. 26, 2024

(54) PROCESS FOR PREPARING POLYCARBONATE AND CATALYTIC SYSTEM USED

(71) Applicant: ENI S.P.A., Rome (IT)

(72) Inventors: Paolo Biagini, San Giuliano Terme (IT); Riccardo Po, Novara (IT); Laura Boggioni, Abbiategrasso (IT); Simona Losio, Gabagnate Milanese (IT)

(73) Assignee: ENI S.P.A., Rome (IT)

( * ) Notice: Subject to any disclaimer, the term of this patent is extended or adjusted under 35 U.S.C. 154(b) by 287 days.

This patent is subject to a terminal disclaimer.

(21) Appl. No.: 16/763,740

(22) PCT Filed: Nov. 13, 2018

(86) PCT No.: PCT/EP2018/081025
§ 371 (c)(1),
(2) Date: May 13, 2020

(87) PCT Pub. No.: WO2019/092266
PCT Pub. Date: May 16, 2019

(65) Prior Publication Data
US 2020/0369828 A1  Nov. 26, 2020

(30) Foreign Application Priority Data
Nov. 13, 2017 (IT) .................. 102017000129013

(51) Int. Cl.
| | | |
|---|---|---|
| *C08F 8/08* | (2006.01) | |
| *B01J 31/02* | (2006.01) | |
| *B01J 31/22* | (2006.01) | |
| *B01J 31/34* | (2006.01) | |
| *C08G 64/34* | (2006.01) | |

(52) U.S. Cl.
CPC .......... *C08G 64/34* (2013.01); *B01J 31/0268* (2013.01); *B01J 31/2243* (2013.01); *B01J 31/34* (2013.01)

(58) Field of Classification Search
None
See application file for complete search history.

(56) References Cited

U.S. PATENT DOCUMENTS

| 4,567,232 A | 1/1986 | Echte et al. |
| 6,870,004 B1 | 3/2005 | Nguyen |

FOREIGN PATENT DOCUMENTS

| CN | 101580560 A | 11/2009 |
| CN | 101885794 A | 11/2010 |
| CN | 103665217 A | 3/2014 |
| RU | 2 607 086 C2 | 1/2017 |

OTHER PUBLICATIONS

Reibenspies et al. (\JACS, 130, 6523-6533 (Year: 2008).*
Darensbourg et al , JACS, 2005, 127, 14026-14038 (Year: 2005).*
Cristau et al (The chemistry of organophosphorus compounds., vol. 3, Phosphonium salts, ylides and phosphoranes, Edited by Frank R. Hartley, p. 47-163 (Year: 1994).*
International Search Report dated Dec. 10, 2018 for PCT application No. PCT/EP2018/081025.
Written Opinion dated Dec. 10, 2018 for PCT application No. PCT/EP2018/081025.
Din-Yu Rao et al; "Binding of 4-(N,N-dimethylamino) Pyridine to Salen- and Salan-Cr (III) Cations: A Mechanistic Understanding on the Difference in their Catalytic Activity for C0B 2/Expoxide Copolymerization"; Inorganic Chemistry; vol. 48, No. 7; pp. 1-8.
Bio Li et al; "Asymmetric, Regio- and Stereo-Selective Alternating Copolymerization of C0 2 and Propylene Oxide Catalyzed by Chiral Chromium Salan Complexes"; Journal of Polymer Science, Part A: Polymer Chemistry; vol. 46, No. 18; Sep. 15 2008; pp. 12.
Russian Office Action and Search Report dated Apr. 17, 2023 from corresponding Russian Patent Application No. 2020142946, 10 pages.

* cited by examiner

*Primary Examiner* — Yun Qian
(74) *Attorney, Agent, or Firm* — Ruggiero McAllister & McMahon LLC

(57) ABSTRACT

The present invention relates to a process for preparing polycarbonate comprising copolymerizing an epoxy compound and carbon dioxide ($CO_2$) in the presence of a catalytic system comprising:
  at least one catalyst selected from complexes of a transition metal;
  at least one co-catalyst selected from ionic compounds, as well as to a catalytic system comprising:
  at least one catalyst selected from complexes of a transition metal;
  at least one co-catalyst selected from ionic compounds.

1 Claim, No Drawings

PROCESS FOR PREPARING POLYCARBONATE AND CATALYTIC SYSTEM USED

CROSS-REFERENCE TO A RELATED APPLICATION

The present application claims priority based on PCT Application No. PCT/EP2018/081025, filed Nov. 13, 2018, which claims priority based on Italy Patent Application No. 102017000129013, filed Nov. 13, 2017.

DESCRIPTION

The present invention relates to a process for preparing polycarbonate.

More in particular, the present invention relates to a process for preparing polycarbonate comprising copolymerizing an epoxy compound and carbon dioxide ($CO_2$) in the presence of a catalytic system comprising: at least one catalyst selected from complexes of a transition metal; at least one co-catalyst selected from ionic compounds.

The subject matter of the present invention is also a catalytic system comprising: at least one catalyst selected from complexes of a transition metal; at least one co-catalyst selected from ionic compounds.

It is known that aliphatic polycarbonates are biodegradable polymers mainly used in multi-layer compositions for barrier films, as thickeners in the formulation of inks and in the production of fancy goods. Their interest at industrial level also derives from the fact that aliphatic polycarbonates may be produced without the use of hazardous reagents such as, for example, phosgene, through a process that envisages the copolymerization of an epoxy compound and carbon dioxide ($CO_2$): said process is therefore "eco-friendly" and has greater development prospects especially due to the use of carbon dioxide ($CO_2$) which is considered a readily available and low cost compound.

Since the 1960s many researchers have developed various types of catalytic systems adapted for preparing polycarbonates by means of alternate copolymerization between an epoxy compound and carbon dioxide ($CO_2$).

For example, Inoue S. et al, in "*Journal of Polymer Science Part C: Polymer Letters*" (1969), Vol. 7, Issue 4, pag. 287-292, describe the use of a heterogeneous catalytic system, insufficiently characterized and obtained by partial hydrolysis of diethylzinc ($ZnEt_2$), in the copolymerization of an epoxy compound and carbon dioxide ($CO_2$). However, the so obtained catalyst has very low activity levels, requiring a number of days to produce significant amounts of polycarbonate.

Aida T. et al, in "*Journal of American Chemical Society*" (1983), Vol. 105, pag. 1304-1309, describe the use of aluminum porphyrins having the purpose of activating the carbon dioxide ($CO_2$) which is subsequently reacted with an epoxy compound. Also in this case, the catalytic activity is insufficient (<0.3 turnovers/h).

Darensbourg D. J. et al, in "*Macromolecules*" (1995), Vol. 28, pag. 7577-7579, describe the use of some hindered zinc(II) phenoxides in the copolymerization of an epoxy compound and carbon dioxide ($CO_2$), obtaining catalytic activity up to 2.4 turnovers/h. Over the years, some researchers have proposed the use of catalytic systems based on transition metals and, in particular, the use of chromium(III) or cobalt(III) complexes.

For example, Holmes A. B. et al, in "*Macromolecules*" (2000), Vol. 33(2), pag. 303-308, describe the use of particular chromium(III) porphyrins in the copolymerization of an epoxy compound and carbon dioxide ($CO_2$). In particular, they describe the production of polycarbonates, in particular poly(cyclohexene carbonates) with considerable yields variable around 50%-70% and having not very high molecular weights [i.e. having a number average molecular weight ($M_n$) ranging from 1500 to 3900].

Chen X. et al, in "*Polymer*" (2009), Vol. 50, pag. 441-446, describe the use of a series of chromium(III) complexes/Schiff base N,N'-bis(salicylidene)-1,2-phenyldiamine chromium(III) halides (e.g., [Cr(Salen)Cl]) for producing polypropylene carbonate, with not very high yields (<50%) and unsatisfactory selectivity towards the formation of polypropylene oxide and/or cyclic dicarbonate, but with interesting molecular weights (number average molecular weight $M_n$ up to 25000). Similar results were obtained by Lu X. et al, in "*Science China Chemistry*" (2010), Vol. 53, pag. 1646-1652, who describe the use of complexes based on Co(Salen)Cl for the purpose of producing polypropylene carbonate with yields around 50% and variable molecular weights (number average molecular weights $M_n$ ranging from 6500 to 30000).

Pescarmona P. P. et al, in the review "*Journal of Applied Polymer Science*" (2014), DOI: 10.1002/APP.41141, effectively describe all the aspects inherent to the reaction between epoxides and carbon dioxide ($CO_2$) reporting the chemical/physical characterization of the polymers obtained and their current potential field of application.

From careful reading of the prior art in relation to the use of catalytic systems based on transition metals for producing polycarbonates it may be deduced that the transition metal complexes proposed as catalysts are activated through the addition of particular co-catalysts that are generally constituted by strong bases such as, for example, organic Lewis bases, or organic ionic species such as, for example, quaternary ammonium salts or compounds such as bis(triphenylphosphoranylidene)ammonium chloride (PPNCl) having formula (Ia):

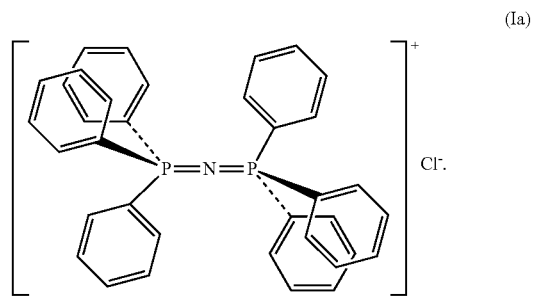

(Ia)

Often the nature of the co-catalyst and the molar ratio with the transition metal complex used, dramatically change the yield and the selectivity of the copolymerization reaction between the epoxy compound and carbon dioxide ($CO_2$), as well as the characteristics of the polycarbonate obtained.

For example, Darensbourg D. et al, in "*Organometallics*" (2005), Vol. 24(1), pag. 144-148, describe the use of different co-catalysts, for example, bis(triphenylphosphoranylidene)ammonium azide ([PPN][$N_3$]), in the presence of catalysts selected from chromium/salen complexes, in the copolymerization of cyclohexene oxide and carbon dioxide ($CO_2$): then their behavior is studied and an activation mechanism is proposed.

Lu X. B. et al, in "*Journal of the American Chemical Society*" (2006), Vol. 128(5), pag. 1664-1674, describe the use of different co-catalysts such as, for example, organic ionic ammonium salts or strong organic bases based on sterically hindered amines in the presence of cobalt complexes such as Co(Salen)Cl, in the copolymerization of an epoxy compound and carbon dioxide ($CO_2$): then the selectivity in the production of the polymer, enantioselectivity and stereochemical control are studied.

From the above, the importance of the role of the co-catalyst in the production of polycarbonate is therefore clear for the purpose of having an efficient catalytic system in terms of activity and selectivity, as well as in the determination of the final properties of the polycarbonate obtained.

Since, as mentioned above, the process for obtaining polycarbonate that envisages the copolymerization of an epoxy compound and carbon dioxide ($CO_2$) is "eco-friendly" and of interest especially because of the use of carbon dioxide ($CO_2$) which is considered a readily available and low cost component, the study of new processes for obtaining polycarbonate that envisages the copolymerization of an epoxy compound and carbon dioxide ($CO_2$) is still of great interest.

The Applicant therefore set out to solve the problem of finding a new process for obtaining polycarbonate through the copolymerization of an epoxy compound and carbon dioxide ($CO_2$).

The Applicant has now found a process for preparing polycarbonate comprising copolymerizing an epoxy compound and carbon dioxide ($CO_2$) in the presence of a catalytic system comprising: at least one catalyst selected from complexes of a transition metal; at least one co-catalyst selected from ionic compounds. Said catalytic system, as well as having good performance levels in terms of activity and selectivity, allows the properties of the polycarbonate to be modulated according to the final use, in particular, in terms of molecular weight [i.e. weight average molecular weight ($M_w$) and number average molecular weight ($M_n$)] and of polydispersion index (PDI) corresponding to the ratio between the weight average molecular weight ($M_w$) and the number average molecular weight ($M_n$) (i.e. the $M_w/M_n$ ratio).

The subject matter of the present invention is therefore a process for preparing polycarbonate comprising copolymerizing an epoxy compound and carbon dioxide ($CO_2$) in the presence of a catalytic system comprising:
at least one catalyst selected from complexes of a transition metal having general formula (I):

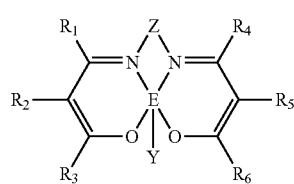

(I)

wherein:
E represents a metal atom selected from chromium, manganese, iron, cobalt, nickel, aluminum, preferably chromium, cobalt;
$R_5$, $R_6$, $R_7$, $R_8$, $R_9$ and $R_{10}$, identical or different, represent a hydrogen atom; or are selected from linear or branched, saturated or unsaturated $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups; or $R_6$ and $R_7$ and/or $R_9$ and $R_{10}$, may optionally be linked together to form, together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;
Y represents a halogen anion such as, for example, a fluoride anion, a chloride anion, a bromide anion, an iodide anion, preferably a chloride anion, a bromide anion; or is selected from inorganic anions such as, for example, azide anion, hydroxide anion, amide anion, perchlorate anion, chlorate anion, sulfate anion, phosphate anion, nitrate anion, preferably an azide anion; or is selected from organic anions such as, for example, $C_1$-$C_{20}$ alcoholate anion, $C_1$-$C_{20}$ thioalcoholate anion, $C_1$-$C_{30}$ carboxylate anion, $C_1$-$C_{30}$ alkyl- or dialkyl-amide anion;
Z represents a divalent organic radical having general formula (Ill), (IV) or (V):

(III)

(IV)

(V)

wherein:
$R_{11}$, $R_{12}$, $R_{13}$, $R_{14}$, $R_{15}$ and $R_{16}$, identical or different, represent a hydrogen atom; or are selected from linear or branched, saturated or unsaturated $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups;
or $R_{11}$ and $R_{12}$ in general formula (III) or in general formula (IV), or $R_{11}$ and $R_{13}$ in general formula (IV), or $R_{11}$ and $R_{15}$ or $R_{11}$ and $R_{16}$ in general formula (V), may optionally be linked together to form, together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as oxygen, sulfur, nitrogen, silicon, phosphorus, selenium, preferably oxygen, nitrogen;

at least one co-catalyst selected from ionic compounds having general formula (II):

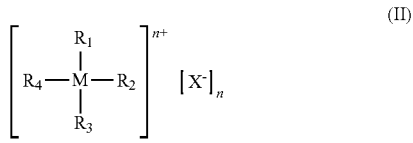

wherein:
M represents a metal atom selected from phosphorus, arsenic, antimony, bismuth, preferably phosphorus;

$R_1$, $R_2$, $R_3$ and $R_4$, identical or different, represent a hydrogen atom; or represent a halogen atom such as, for example, fluorine, chlorine, bromine, preferably fluorine, bromine; or are selected from linear or branched, saturated or unsaturated $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in the cationic form, optionally substituted cycloalkyl groups, optionally substituted heterocyclic groups, said optionally substituted heterocyclic groups being optionally in the cationic form;

or $R_1$ and $R_2$, and/or $R_2$ and $R_3$, and/or $R_3$ and $R_4$, and/or $R_4$ and $R_1$, may optionally be linked together to form, together with the other atoms to which they are linked, a saturated, unsaturated or aromatic cycle containing from 1 to 12 carbon atoms, which may optionally be substituted with linear or branched, saturated or unsaturated $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

$X^-$ represents a halogen anion such as, for example, a fluoride anion, a chloride anion, a bromide anion, an iodide anion, preferably a chloride anion, a bromide anion; or is selected from inorganic anions such as, for example, azide anion, perchlorate anion, chlorate anion, sulfate anion, phosphate anion, nitrate anion, hexafluorophosphate anion, tetrafluoroborate anion; or is selected from organic anions such as, for example, benzenesulfonate anion, toluenesulfonate anion, dodecylsulfate anion, octylphosphate anion, dodecylphosphate anion, octadecylphosphate anion, phenylphosphate anion, tetraphenylborate anion; preferably a chloride anion, a bromide anion, an azide anion, a tetrafluoroborate anion, a sulfate anion;

provided that at least three of $R_1$, $R_2$, $R_3$ and $R_4$, are different from hydrogen.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "$C_1$-$C_{20}$ alkyl groups" means alkyl groups having from 1 to 20 carbon atoms, linear or branched, saturated or unsaturated. Specific examples of $C_1$-$C_{20}$ alkyl groups are: methyl, ethyl, n-propyl, iso-propyl, n-butyl, iso-butyl, tert-butyl, pentyl, hexyl, heptyl, octyl, 2-ethyheptyl, 2-ethylhexyl, 2-butenyl, 2-pentenyl, 2-ethyl-3-hexenyl, 3-octenyl, 1-methyl-4-hexenyl, 2-butyl-3-hexenyl.

For the purpose of the present description and of the following claims, the term "$C_1$-$C_{20}$ alkyl groups optionally containing heteroatoms" means alkyl groups having from 1 to 20 carbon atoms, linear or branched, saturated or unsaturated, wherein at least one of the hydrogen atoms is substituted with a heteroatom selected from: halogens such as, for example, fluorine, chlorine, bromine, preferably fluorine; nitrogen; sulfur; oxygen.

Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichlororoethyl, 2,2,3,3-tetrafluoropropyl, 2,2,3,3,3-pentafluoropropyl, perfluoropentyl, perfluoroctyl, perfluorodecyl, ethyl-2-methoxy, propyl-3-ethoxy, butyl-2-thiomethoxy, hexyl-4-amino, hexyl-3-N,N'-dimethylamino, methyl-N,N'-dioctylamino, 2-methyl-hexyl-4-amino.

For the purpose of the present description and of the following claims, the term "aryl groups" means aromatic carbocyclic groups containing from 6 to 60 carbon atoms. Said aryl groups may optionally be substituted with one or more groups, identical or different, selected from: halogen atoms such as, for example, fluorine, chlorine, bromine, preferably fluorine; hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphyl, phenylnaphthyl, phenanthrene, anthracene.

For the purpose of the present description and of the following claims, the term "heteroaryl groups" means aromatic heterocyclic penta- or hexa-atomic groups, also benzocondensates or heterobicyclic, containing from 4 to 60 carbon atoms and from 1 to 4 heteroatoms selected from nitrogen, oxygen, sulfur, silicon, selenium, phosphorus. Said heteroaryl groups may optionally be substituted with one or more groups, identical or different, selected from: halogen atoms such as, for example, fluorine, chlorine, bromine, preferably fluorine; hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups;

amine groups; $C_1$-$C_{12}$ mono- or di-alkylamine groups; nitro groups. Specific examples of heteroaryl groups are: pyridine, methylpyridine, methoxymethylpyridine, phenylmethylpyridine, fluoromethylpyridine, pyrimidine, pyridazine, pyrazine, triazine, tetrazine, quinoline, quinoxaline, quinazoline, furan, thiophene, hexylthiophene, bromothiophene, dibromothiophene, pyrrole, oxazole, thiazole, isoxazole, isothiazole, oxadiazole, thiadiazole, pirazole, imidazole, triazole, tetrazole, indole, benzofuran, benzothiophene, benzoxazole, benzothiazole, benzoxadiazole, benzothiadiazole, benzopirazole, benzimidazole, benzotriazole, triazole pyridine, triazole pyrimidine, coumarin. Said optionally substituted heteroaryl groups may optionally be in the cationic form. Specific examples of heteroaryl groups in the cationic form are: pyridinium, N-methyl-pyridinium, N-butyl-pyridinium, N-phenyl-pyridinium, N-methyl-4-methoxy-pyridinium, N-ethyl-2-fluoro-pyridinium, pyrilium, trimethyl-pyrilium, 2,6di-tert-butyl-pyrilium, 4-phenyl-2,6-dipropyl-pyrilium, 2,6-di-tert-butyl-thiopyrilium, 2,6-diphenyl-thiopyrilium.

For the purpose of the present description and of the following claims, the term "cycloalkyl groups" means cycloalkyl groups having from 3 to 60 carbon atoms. Said cycloalkyl groups may optionally be substituted with one or more groups, identical or different, selected from: halogen atoms such as, for example, fluorine, chlorine, bromine, preferably fluorine; hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of cycloalkyl groups are: cyclopropyl, 2,2-difluorocyclopropyl, cyclobutyl, cyclopentyl, cyclohexyl, methylcyclohexyl, methoxycyclohexyl, fluorocyclohexyl, phenylcyclohexyl, decalin, abiethyl.

For the purpose of the present description and of the following claims, the term "heterocyclic groups" means rings having from 3 to 12 atoms, saturated or unsaturated, containing at least one heteroatom selected from nitrogen, oxygen, sulfur, silicon, selenium, phosphorus, optionally condensed with other aromatic or non-aromatic rings. Said heterocyclic groups may optionally be substituted with one or more groups, identical or different, selected from: halogen atoms such as, for example, fluorine, chlorine, bromine, preferably fluorine; hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of heterocyclic groups are: pyrrolidine, methoxypyrrolidine, piperidine, fluoropiperidine, methylpiperidine, dihydropyridine, piperazine, morpholine, thiazine, indoline, phenylindoline, 2-ketoazetidine, diketopiperazine, tetrahydrofuran, tetrahydrothiophene. Said optionally substituted heterocyclic groups may optionally be in cationic form. Specific examples of heterocyclic groups in cationic form are: N-butylpyrrolidinium, N,N'-dimethylpyrrolidinium, N,N'-diethylpyrrolidinium, N-ethyl,N'-phenylpyrrolidinium, N,N'-dimethylpiperidinium, N-methyl, N'-butylpiperidinium, N-methyl, N'-phenylpiperidinium.

For the purpose of the present description and of the following claims, the term "cyclo" means a system containing from 1 to 12 carbon atoms, optionally containing heteroatoms selected from nitrogen, oxygen, sulfur, silicon, selenium, phosphorus. Specific examples of cyclo are: toluene, benzonitrile, cycloheptatriene, cyclooctadiene, pyridine, piperidine, tetrahydrofuran, thiadiazole, pyrrole, thiophene, selenophene, tert-butylpyridine.

For the purpose of the present description and of the following claims, the term "trialkyl- or triaryl-silyl groups" means groups comprising a silicon atom to which three $C_1$-$C_{12}$ alkyl groups, or three $C_6$-$C_{24}$ aryl groups, or a combination thereof, are linked. Specific examples of trialkyl- or triaryl-silyl groups are: trimethylsilane, triethylsilane, trihexylsilane, tridodecylsilane, dimethyl(dodecyl)silane, triphenylsilane, methyl(diphenyl)silane, dimethyl (naphthyl)silane.

For the purpose of the present description and of the following claims, the term "dialkyl- or diaryl-amine groups" means groups comprising a nitrogen atom to which two $C_1$-$C_{12}$ alkyl groups, or two $C_6$-$C_{24}$ aryl groups, or a combination thereof, are linked. Specific examples of dialkyl- or diaryl-amine groups are: dimethylamine, diethylamine, dibutylamine, diisobutylamine, diphenylamine, methylphenylamine, dibenzylamine, ditolylamine, dinaphthylamine For the purpose of the present description and of the following claims, the term "dialkyl- or diaryl-phosphine groups" means groups comprising a phosphorus atom to which two $C_1$-$C_{12}$ alkyl groups, or two $C_6$-$C_{24}$ aryl groups, or a combination thereof, are linked. Specific examples of dialkyl- or diaryl-phosphine groups are: dimethylphosphine, diethylphosphine, dibutylphosphine, diphenylphosphine, methylphenylphosphine, dinaphthylphosphine.

For the purpose of the present description and of the following claims, the term "$C_1$-$C_{20}$ alkoxy groups" means groups comprising an oxygen atom to which a linear or branched $C_1$-$C_{20}$ alkyl group is linked. Specific examples of $C_1$-$C_{20}$ alkoxy groups are: methoxy, ethoxy, n-propoxy, iso-propoxy, n-butoxy, iso-butoxy, tert-butoxy, pentoxy, hexyloxy, heptyloxy, octyloxy, nonyloxy, decyloxy, dodecyloxy.

For the purpose of the present description and of the following claims, the term "aryloxy groups" means groups comprising an oxygen atom to which a linear or branched $C_6$-$C_{24}$ aryl group is linked. Said aryloxy groups may optionally be substituted with one or more groups, identical or different, selected from: halogen atoms such as, for example, fluorine, chlorine, bromine, preferably fluorine; hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; cyano groups; amine groups; $C_1$-$C_{12}$ mono- or di-alkylamine groups; nitro groups. Specific examples of aryloxy groups are: phenoxyl, para-methylphenoxyl, para-fluorophenoxyl, ortho-butylphenoxyl, naphtyloxyl, anthracenoxyl.

For the purpose of the present description and of the following claims, the term "thioalkoxy or thioaryloxy groups" means groups comprising a sulfur atom to which a $C_1$-$C_{12}$ alkoxy group or a $C_6$-$C_{24}$ aryloxy group is linked. Said thioalkoxy or thioaryloxy groups may optionally be substituted with one or more groups, identical or different, selected from: halogen atoms such as, for example, fluorine, chlorine, bromine, preferably fluorine, hydroxyl groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; cyano groups; amine groups; $C_1$-$C_{12}$ mono- or di-alkylamine groups; nitro groups. Specific examples of thioalkoxy or thioaryloxy groups are: thiomethoxyl, thioethoxyl, thiopropoxyl, thiobutoxyl, thio-iso-butoxyl, 2-ethylthiohexyloxyl, thiophenoxyl, para-methylthiophenoxyl, para-fluorothiophenoxyl, ortho-butylthiophenoxyl, napthylthioxyl, anthracenylthioxyl.

For the purpose of the present description and of the following claims, the term "polyethyleneoxy groups" means groups having from 2 to 80 carbon atoms containing at least one oxyethylene unit. Specific examples of polyethyleneoxy groups are: methyloxy-ethyleneoxyl, methyloxy-diethyleneoxyl, 3-oxatetraoxyl, 3,6-dioxaheptyloxyl, 3,6,9-trioxadecyloxyl, 3,6,9,12-tetraoxahexadecyloxyl.

Specific examples of complexes of a transition metal having general formula (I) are reported in Table 1.

TABLE 1-continued

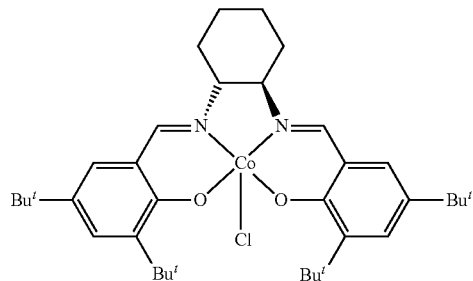

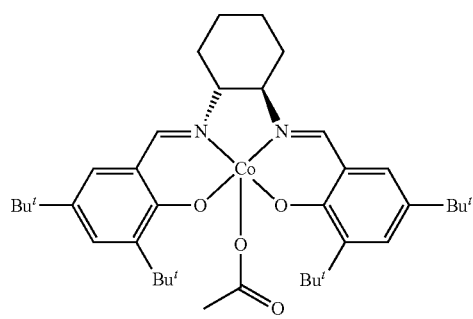

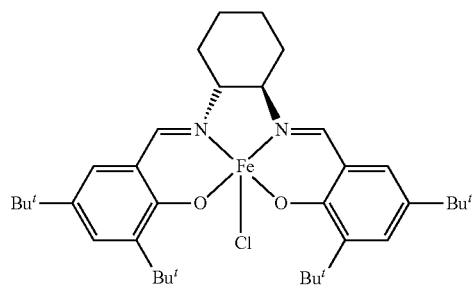

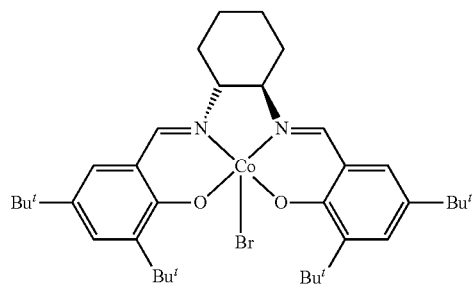

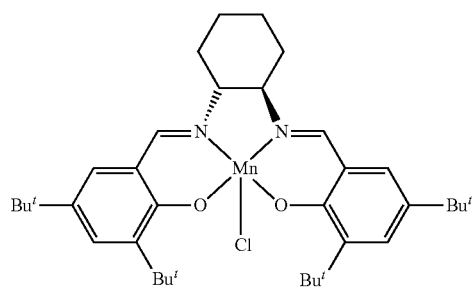

TABLE 1-continued

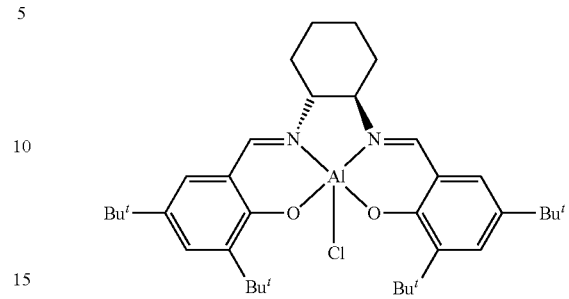

The complexes of a transition metal having general formula (I) may be prepared according to processes known in the art as described, for example, by Jacobsen E. N. et al, in "*Journal of Organic Chemistry*" (1994), Vol. 59(7), pag. 1939-1942. Further details related to the preparation of said complexes of a transition metal having general formula (I) may be found in the following examples. Some complexes of a transition metal having general formula (I) are, instead, commercially available.

Specific examples of ionic compounds having general formula (II) are reported in Table 2.

TABLE 2

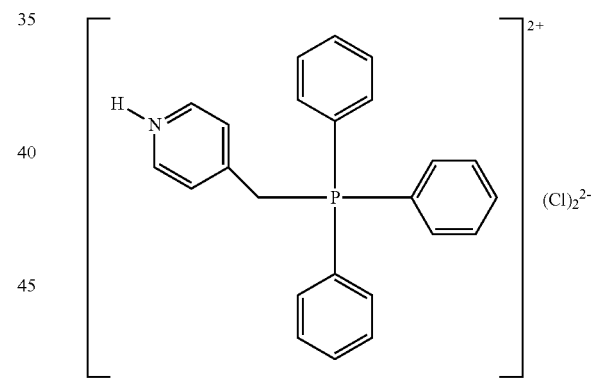

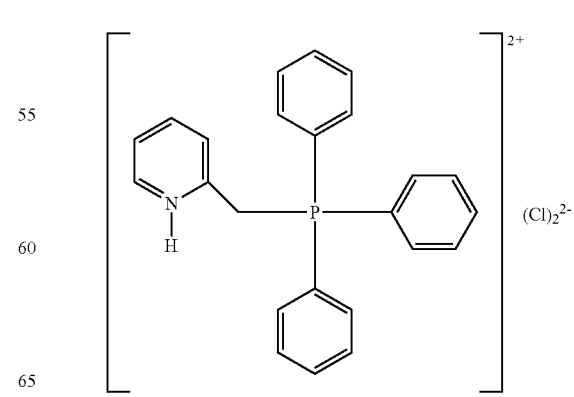

TABLE 2-continued
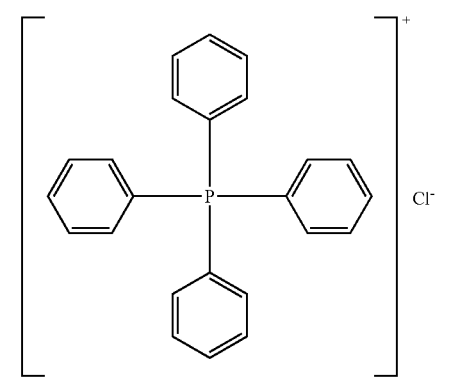
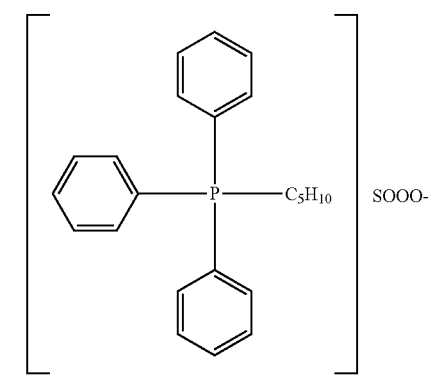
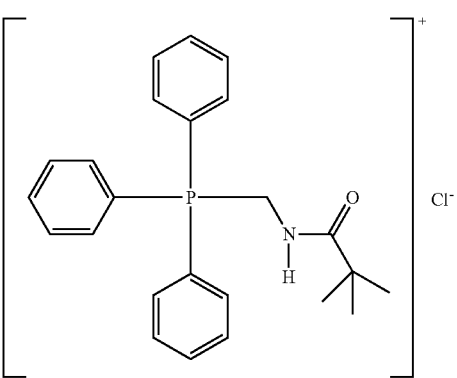
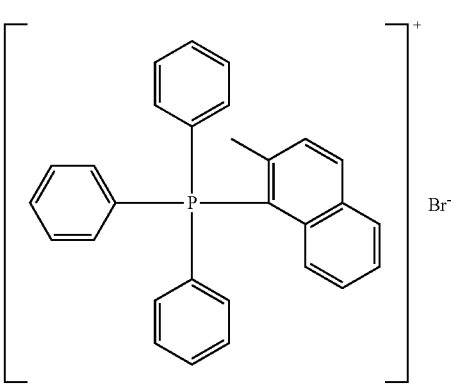
TABLE 2-continued
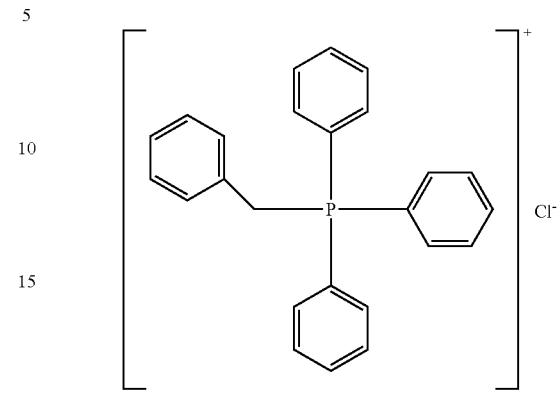
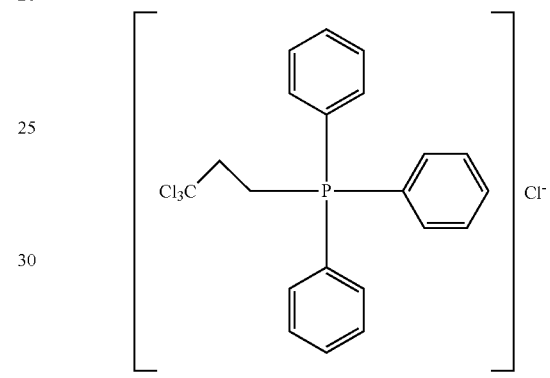
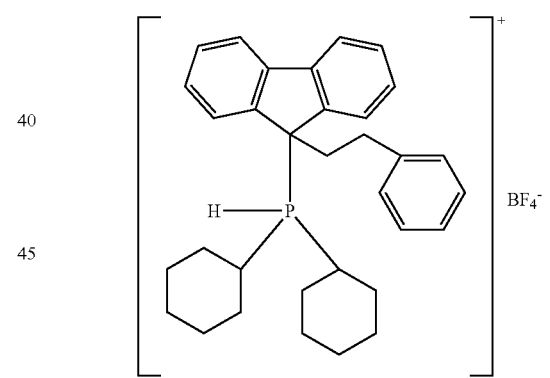
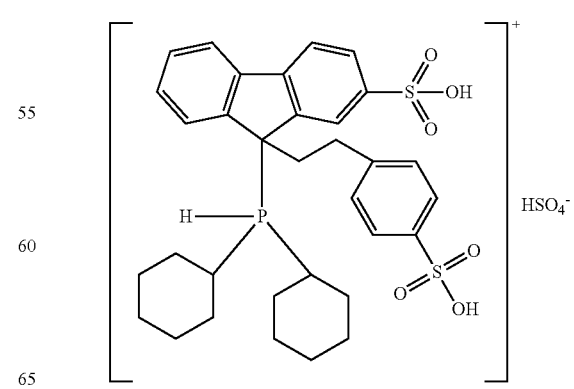

TABLE 2-continued
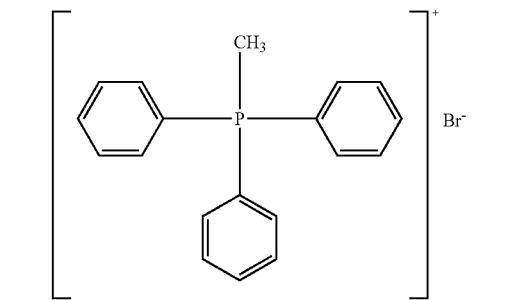
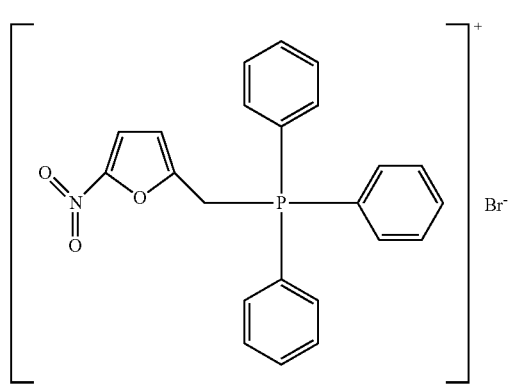
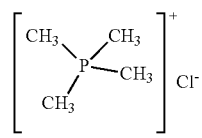
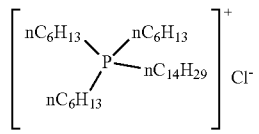
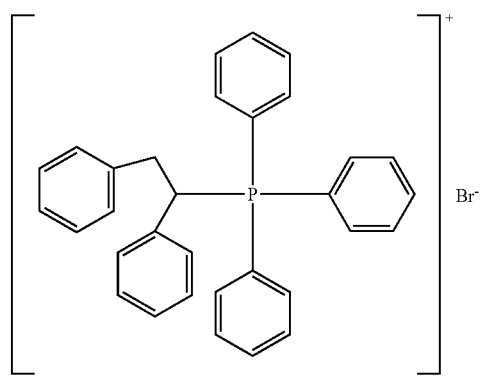
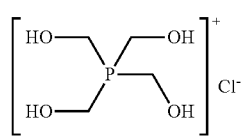
TABLE 2-continued
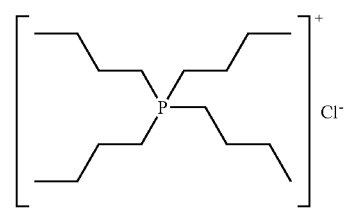
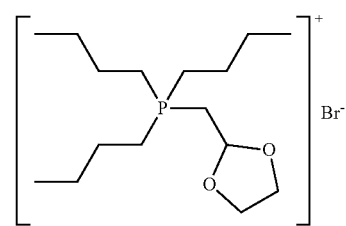
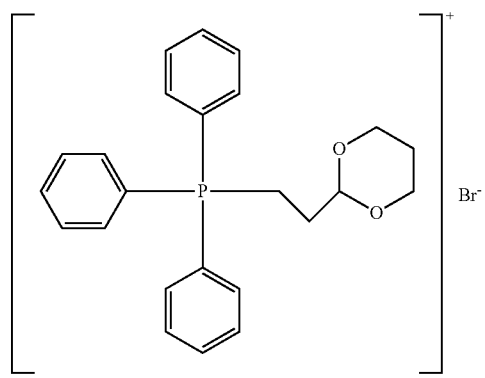
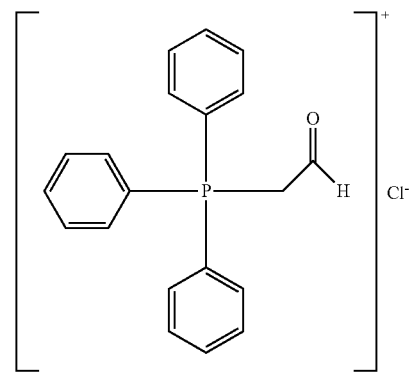
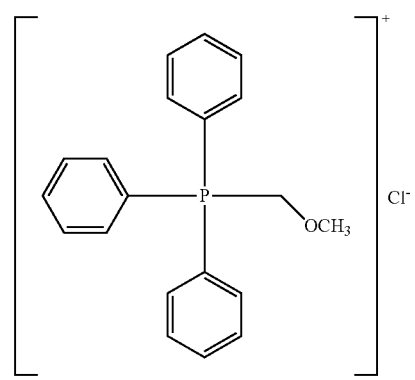

TABLE 2-continued

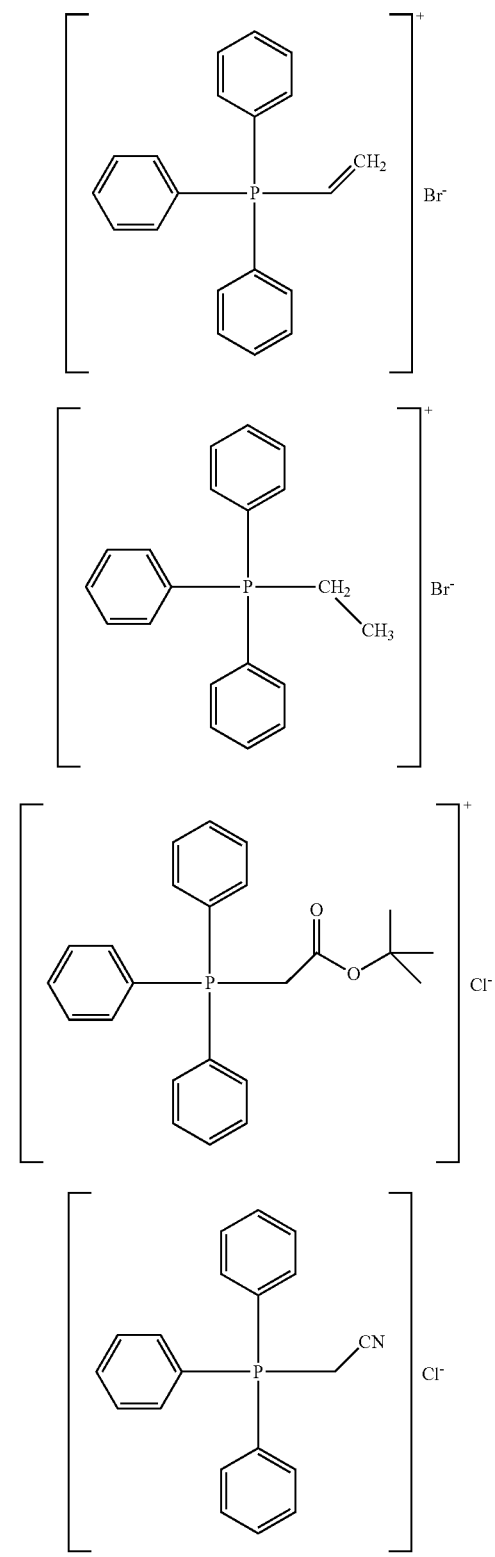

The ionic compounds having general formula (II) may be prepared according to processes known in the art as described, for example, by Cristau H. J. et al, in "*The Chemistry of Organophosphorus Compounds*", Vol. 3, Chapter 2: "*Preparation, properties and reactions of phosphonium salts*", pag. 47-163, Edited by F. R. Hartley, 1994 John Wiley & Sons. Some ionic compounds having general formula (II) are, instead, commercially available.

In accordance with a preferred embodiment of the present invention, said epoxy compound may be selected, for example, from: $C_2$-$C_{20}$ alkylene oxides, optionally substituted with one or more halogen atoms or with one or more alkoxy groups; $C_4$-$C_{20}$ cycloalkylene oxides, optionally substituted with one or more halogen atoms or with one or more alkoxy groups; $C_8$-$C_{20}$ styrene oxides, optionally substituted with one or more halogen atoms or with one or more alkoxy, alkyl or aryl groups.

In accordance with a preferred embodiment of the present invention, said epoxy compound may be selected, for example, from ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorhydrin, epichlorhydrin, epibromhydrin, isopropyl glycidyl ether, butyl glycidyl ether, tert-butyl glycidyl ether, 2-ethylhexyl glycidyl ether, allyl glycidyl ether, cyclopentene oxide, cyclohexene oxide, cyclooctene oxide, cyclododecene oxide, α-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidylmethylphenyl ethers, chlorophenyl-2,3-epoxypropyl ethers, epoxypropyl methoxyphenyl ethers, biphenyl glycidyl ethers, glycidyl naphtyl ethers, or mixtures thereof. Cyclohexene oxide, propylene oxide, are preferred.

For the purpose of obtaining, at the end of the aforesaid process, a solution comprising polycarbonate and the catalytic system, said process may be carried out in the presence of an organic solvent.

In accordance with a preferred embodiment of the present invention, said process may be carried out in presence of at least one organic solvent which may be selected, for example, from: aliphatic hydrocarbons such as, for example, pentane, octane, decane, cyclohexane, or mixtures thereof; aromatic hydrocarbons such as, for example, benzene, toluene, xylene, or mixtures thereof; halogenated hydrocarbons such as, for example, dichloromethane, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, bromobenzene, or mixtures thereof; or mixtures thereof. Dichloromethane is preferred.

In accordance with a preferred embodiment of the present invention, said organic solvent may be used in a ratio by volume with respect to said at least one epoxy compound ranging from 0:100 to 99:1, preferably ranging from 0:100 to 90:1.

In accordance with a further preferred embodiment, said at least one epoxy compound acts as a solvent.

In accordance with a preferred embodiment of the present invention, in said process said catalytic system and said at least one epoxy compound may be used in molar ratios ranging from 1:100 to 1:100000, preferably ranging from 1:1000 to 1:10000.

In accordance with a preferred embodiment of the present invention, in said catalytic system said at least one catalyst selected from transition metal complexes having general formula (I) and said at least one co-catalyst selected from ionic compounds having general formula (II) may be used in a molar ratio ranging from 100:1 to 1:100, preferably ranging from 2:1 to 1:2, more preferably it is 1:1.

In accordance with a preferred embodiment of the present invention, said process may be carried out at a temperature ranging from 20° C. to 250° C., preferably ranging from 40° C. to 160° C.

In accordance with a preferred embodiment of the present invention, said process may be carried out at a pressure ranging from 1 atm to 100 atm, preferably ranging from 2 atm to 60 atm.

In accordance with a preferred embodiment of the present invention, said process may be carried out for a time ranging from 30 minutes to 30 hours, preferably ranging from 1.5 hours to 26 hours.

The process according to the present invention may be carried out discontinuously (in batches), semi-continuously (in semi-batches), or continuously.

Preferably, the polycarbonate obtained according to the process according to the present invention has a number average molecular weight ($M_n$) ranging from 500 to 200000 and a polydispersion index (PDI) corresponding to the ratio between the weight average molecular weight ($M_w$) and the number average molecular weight ($M_n$) (i.e. to the ratio $M_w/M_n$) ranging from 1.01 to 6.0.

Preferably, the polycarbonate obtained in accordance with the process according to the present invention comprises at least 80% of carbonate bonds, preferably at least 99% of carbonate bonds.

The polycarbonate obtained in accordance with the process according to the present invention, is easily degradable, does not form residuals or ashes in combustion, and may be advantageously used for packaging, insulation and coatings.

As mentioned above, the subject matter of the present invention is also a catalytic system comprising: at least one catalyst selected from complexes of a transition metal having general formula (I); at least one co-catalyst selected from ionic compounds having general formula (II).

Therefore, the present invention also relates to a catalytic system comprising:
at least one catalyst selected from complexes of a transition metal having general formula (I):

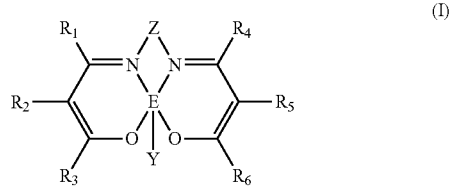

(I)

wherein:
- E represents a metal atom selected from chromium, manganese, iron, cobalt, nickel, aluminum, preferably chromium, cobalt;
- $R_5$, $R_6$, $R_7$, $R_8$, $R_9$ and $R_{10}$, identical or different, represent a hydrogen atom; or are selected from linear or branched, saturated or unsaturated $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups; or $R_6$ and $R_7$ and/or $R_9$ and $R_{10}$, may optionally be linked together to form, together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;
- Y represents a halogen anion such as, for example, a fluoride anion, a chloride anion, a bromide anion, an iodide anion, preferably a chloride anion, a bromide anion; or is selected from inorganic anions such as, for example, azide anion, hydroxide anion, amide anion, perchlorate anion, chlorate anion, sulfate anion, phosphate anion, nitrate anion, preferably an azide anion; or is selected from organic anions such as, for example, $C_1$-$C_{20}$ alcoholate anion, $C_1$-$C_{20}$ thioalcoholate anion, $C_1$-$C_{30}$ carboxylate anion, $C_1$-$C_{30}$ alkyl- or dialkyl-amide anion;
- Z represents a divalent organic radical having general formula (III), (IV) or (V):

(III)

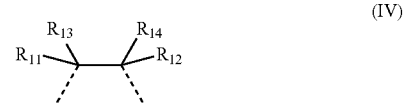

(IV)

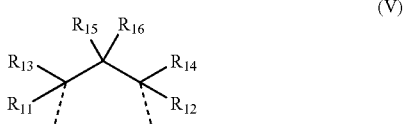

(V)

wherein:
$R_{11}$, $R_{12}$, $R_{13}$, $R_{14}$, $R_{15}$ and $R_{16}$, identical or different, represent a hydrogen atom; or are selected from linear or branched, saturated or unsaturated $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups;
or $R_{11}$ and $R_{12}$ in general formula (III) or in general formula (IV), or $R_{11}$ and $R_{13}$ in general formula (IV), or $R_{11}$ and $R_{15}$ or $R_{11}$ and $R_{16}$ in general formula (V), may optionally be linked together to form, together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

at least one co-catalyst selected from ionic compounds having general formula (II):

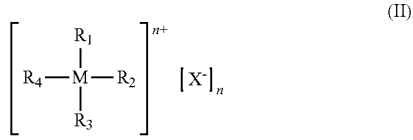

(II)

wherein:

M represents a metal atom selected from phosphorus, arsenic, antimony, bismuth, preferably phosphorus;

$R_1$, $R_2$, $R_3$ and $R_4$, identical or different, represent a hydrogen atom; or represent a halogen atom such as, for example, fluorine, chlorine, bromine, preferably fluorine, bromine; or are selected from linear or branched, saturated or unsaturated $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in the cationic form, optionally substituted cycloalkyl groups, optionally substituted heterocyclic groups, said optionally substituted heterocyclic groups being optionally in the cationic form;

or $R_1$ and $R_2$, and/or $R_2$ and $R_3$, and/or $R_3$ and $R_4$, and/or $R_4$ and $R_1$, may optionally be linked together to form, together with the other atoms to which they are linked, a saturated, unsaturated or aromatic cycle containing from 1 to 12 carbon atoms, which may optionally be substituted with linear or branched, saturated or unsaturated $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

$X^-$ represents a halogen anion such as, for example, a fluoride anion, a chloride anion, a bromide anion, an iodide anion, preferably a chloride anion, a bromide anion; or is selected from inorganic anions such as, for example, azide anion, perchlorate anion, chlorate anion, sulfate anion, phosphate anion, nitrate anion, hexafluorophosphate anion, tetrafluoroborate anion; or is selected from organic anions such as, for example, benzenesulfonate anion, toluenesulfonate anion, dodecylsulfate anion, octylphosphate anion, dodecylphosphate anion, octadecylphosphate anion, phenylphosphate anion, tetraphenylborate anion; preferably a chloride anion, a bromide anion, an azide anion, a tetrafluoroborate anion, a sulfate anion;

provided that at least three of $R_1$, $R_2$, $R_3$ and $R_4$, are different from hydrogen.

For the purpose of better understanding the present invention and to put it into practice, below are reported some illustrative and non-limiting examples thereof.

EXAMPLES

Reagents and Materials

The list below reports the reagents and materials used in the following examples of the invention, any pre-treatments thereof and their manufacturer:

cyclohexene oxide (Aldrich): purity 98%, distilled over calcium hydride ($CaH_2$) in an inert atmosphere;

propylene oxide (Aldrich): purity 99.5%, distilled over calcium hydride ($CaH_2$) in an inert atmosphere;

dichloromethane ($CH_2Cl_2$) (Aldrich) maintained at reflux temperature for 4 hours and distilled over calcium hydride ($CaH_2$);

tetraphenylphosphonium chloride (TPPCl) (Aldrich): 98%, recrystallized twice from a dichloromethane mixture ($CH_2Cl_2$) (Aldrich)/diethylether ($C_2H_5)_2O$ (Aldrich) (1/10, v/v);

triphenyl(4-pyridinylmethyl)phosphonium chloride hydrochloride (UHFFA) (Aldrich): 98%, recrystallized twice from a dichloromethane mixture ($CH_2Cl_2$) (Aldrich)/diethylether ($C_2H_5)_2O$ (Aldrich) (1/10, v/v);

triphenyl(2-pyridinylmethyl)phosphonium chloride hydrochloride (FAO) (Aldrich): 98%, recrystallized twice from a dichloromethane mixture ($CH_2Cl_2$) (Aldrich)/diethylether ($C_2H_5)_2O$ (Aldrich) (1/10, v/v);

carbon dioxide ($CO_2$) (Rivoira): pure, ≥99.8%, used as such;

N,N'-bis(3,5-di-tert-butyl salicylidene)-1,2-cyclohexane-diamine chromium(III) chloride [Cr(Salen)Cl] (Aldrich): used as such;

silver perchlorate ($AgClO_4$) (anhydrous) (Aldrich): used as such;

acetonitrile ($CH_3CN$) (anhydrous) (Aldrich): pure, ≥99.8%, used as such;

sodium azide ($NaN_3$) (Aldrich): pure, ≥99.5%, used as such;

diethylether ($C_2H_5)_2O$ (Aldrich): used as such;

magnesium sulfate ($MgSO_4$) (Merck): pure, ≥99.5%, used as it is;

o-phenylenediamine (Aldrich): used as such;

3,5-di-tert-butylsalicylaldehyde (Aldrich): used as such;

methanol (MeOH) (anhydrous) (Aldrich): pure, 99.8%, used as such;

formic acid (HCOOH) (Aldrich): 95-97%, used as such;

sodium chloride (NaCl) (Aldrich): pure, ≥99%, used as such;

chromium(II) chloride ($CrCl_2$) (Aldrich): 95%, used as such;

tetrahydrofuran (THF) (anhydrous) (Aldrich): used as such;

ammonium chloride ($NH_4Cl$) (Merck): pure, ≥99.9%, used as such;

hydrochloric acid in 37% aqueous solution (Merck): used as such;

acetone [($CH_3)_2O$] (Aldrich): used as such;

deuterated methylene chloride ($CD_2Cl_2$) (Merck): used as such.

Elementary Analysis a) Determination of Carbon, Hydrogen, Nitrogen, Chromium and Phosphorus The determination of carbon, hydrogen, nitrogen, chromium and phosphorus in the compounds synthesized in the following examples, was carried out through a Carlo Erba automatic analyzer Mod. 1106.

NMR Spectra

The NMR spectra of the compounds synthesized in the following examples were acquired with an NMR Bruker Avance 400 spectrometer.

For that purpose, about 10 mg of the sample to be examined were dissolved in about 0.8 ml of $CD_2Cl_2$ (deuterated methylene chloride) directly in the glass tube used for the measurement. The chemical shift scale was calibrated in relation to the signal of the dichloromethane set to 5.30 ppm. The experimental parameters used were as follows:

128 scans;
90° pulse;
delay: 2 s, +4.5 s, of acquisition time;
spectral amplitude: 7200 Hz.

Differential Scanning Calorimetry (DSC)

Differential Scanning calorimetry, for the purpose of determining the glass transition temperature ($T_g$) of the polycarbonates obtained, was carried out through a Perkin Elmer Pyris differential scanning calorimeter. For that purpose, 5 mg of polycarbonate were analyzed, with a scanning speed ranging from 1° C./min to 20° C./min, in an inert nitrogen atmosphere.

Determination of the Molecular Weight

The determination of the molecular weight ($M_w$) of the polycarbonates obtained was carried out through GPC (Gel Permeation Chromatography), using the Waters® Alliance® GPC/V 2000 System by Waters Corporation which uses two detection lines: Refractive Index (RI) and Viscometer operating under the following conditions:

two PLgel Mixed-B columns;
solvent/eluent: o-dichlorobenzene (Aldrich);
flow rate: 0.8 ml/min;
temperature: 145° C.;
molecular mass calculation: Universal Calibration method.

The number average molecular weight ($M_n$), the weight average molecular weight ($M_w$) and the polydispersion index (PDI) are reported ($M_w/M_n$ ratio).

Example 1

Synthesis of N,N'-bis(3,5-di-tert-butylsalicylidene)-1,2-cyclohexanediamine chromium(III) azide [Cr(Salen)N$_3$]

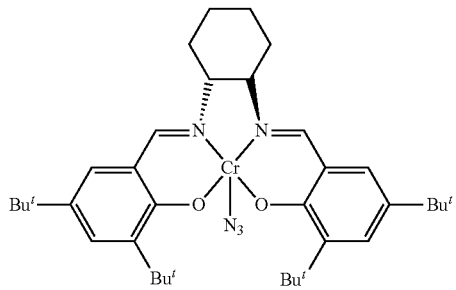

2 g (3.16 mmoles) of N,N'-bis(3,5-di-tert-butylsalicylidene)-1,2-cyclohexanediamine chromium(III) chloride [Cr(Salen)Cl] and 0.65 g (3.16 mmoles) of anhydrous silver perchlorate (AgClO$_4$) were dissolved, respectively, in 120 ml (in a 200 ml two-neck flask) and in 30 ml (in a 500 ml two-neck flask) of anhydrous acetonitrile (CH$_3$CN), under nitrogen flow (N$_2$), at ambient temperature (25° C.). The solution of N,N'-bis(3,5-di-tert-butylsalicylidene)-1,2-cyclohexanediamine chromium(III) chloride [Cr(Salen)Cl] obtained was then dripped, in about 30 minutes, into the solution of silver perchlorate (AgClO$_4$) obtained: the reaction mixture obtained was left, under stirring, at ambient temperature (25° C.), for one night. Subsequently, the reaction mixture was filtered in order to separate the precipitated silver chloride (AgCl) and, after filtration, 0.62 g (9.48 mmoles) of sodium azide (NaN$_3$) were added: the whole was left, under stirring, at ambient temperature (25° C.), for one night, for the purpose of promoting the slow dissolution of sodium azide (NaN$_3$) in the acetonitrile (CH$_3$CN). Subsequently, the mixture obtained was diluted with 150 ml of diethyl ether [(C$_2$H$_5$)$_2$O], then washed with water (3×100 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 2.1 g of a green solid product (yield 88%) corresponding to N,N'-bis(3,5-di-tert-butyl salicylidene)-1,2-cyclohexanediamine chromium(III) azide [Cr(Salen)N$_3$].

Elementary analysis [found (calculated for C$_{36}$H$_{52}$N$_5$O$_2$Cr): C 66.31% (67.68%); H 7.94% (8.20%); N 9.87% (10.96%).

Example 2

Synthesis of N,N'-bis(3,5-di-tert-butylsalicylidene)-1,2-benzodiamine (SalaphenH$_2$)

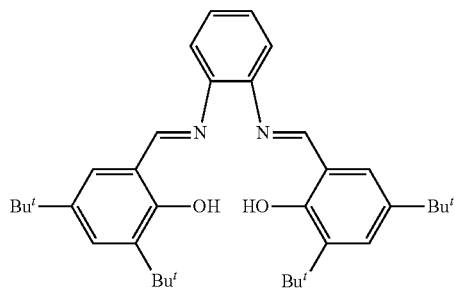

In a 500 ml two-neck flask, 2.0 g (18.5 mmoles) of o-phenylenediamine and 8.67 g (37.0 mmoles) of 3,5-di-tert-butyl-salicylaldehyde were dissolved in 200 ml of anhydrous methanol (MeOH). A few drops (about 0.7 ml) of concentrated formic acid (HCOOH) were added to the solution obtained and the mixture was then refluxed for about 3 hours: the precipitation of a yellow-orange solid was observed. The progress of the reaction was observed through thin layer chromatography (TLC). At the end of the reaction, the solid obtained was separated through filtration, washed with cold anhydrous methanol (MeOH), subsequently dissolved in 20 ml of dichloromethane (CH$_2$Cl$_2$) and washed with water (2×100 ml) and subsequently with a saturated sodium chloride solution (NaCl) (2×100 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 7.5 g of an orange solid product (yield 75%) corresponding to N,N'-bis(3,5-di-tert-butyl-salicylidene)-1,2-benzodiamine (SalaphenH$_2$).

$^1$H NMR (CD$_2$Cl$_2$, 600 MHz); δ (ppm) 8,71 (s, CH=N, 2H), 7.46-7.27 (m, 8H), 1.44 (s, 18H), 1.33 (s, 18H).

Example 3

Synthesis of N,N'-bis(3,5-di-tert-butylsalicylidene)-1,2-benzodiaminechromium(III) chloride [Cr(Salaphen)Cl]

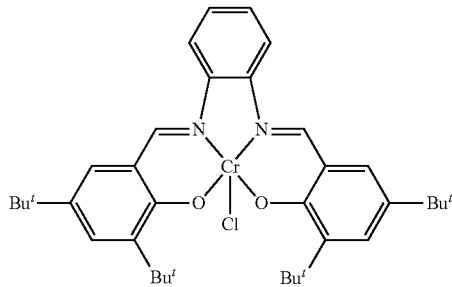

In a 200 ml two-neck flask, 0.5 g (0.924 mmoles) of N,N'-bis(3,5-di-tert-butylsalicylidene)-1,2-benzodiamine (SalaphenH$_2$) obtained as described in Example 2 and 0.125 g (0.996 mmoles) of chromium(II) chloride (CrCl$_2$), were dissolved, under nitrogen flow (N$_2$), in 50 ml of anhydrous tetrahydrofuran (THF). The solution obtained was left, under stirring, at ambient temperature (25° C.), for 24 hours, under nitrogen flow (N$_2$) and, subsequently, for another 24 hours, in air. The mixture obtained was diluted with 50 ml of diethyl ether [(C$_2$H$_5$)$_2$O], then extracted with a saturated solution of ammonium chloride (NH$_4$Cl) (3×100 ml) and subsequently with a saturated solution of sodium chloride (NaCl) (2×80 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 0.466 g of a green microcrystalline powder (yield 82%) corresponding to N,N'-bis(3,5-di-tert-butyl salicylidene)-1,2-benzodiaminechromium(III) chloride [Cr(Salaphen)Cl].

Elementary analysis [found (calculated for C$_{36}$H$_{46}$N$_2$O$_2$CrCl): C 68.47% (69.05%); H 7.72% (7.40%); N 4.28% (4.47%).

$^1$H NMR (CDCl$_3$, 400 MHz); δ (ppm) 8.87 (s, CH=N, 2H), 7.46-7.14 (m, 8H), 1.44 (s, 18H), 1.33 (s, 18H).

Examples 4-9

Preparation of Polycyclohexenecarbonate (Variable Pressure)

A 250 ml steel autoclave was sanitized with thorough washing with acetone [(CH$_3$)$_2$O] and anhydrous methanol (MeOH) and subsequently maintained, under vacuum, at 80° C., for 12 hours.

In the meantime, in a dry box, 0.073 mg (0.115 mmoles) of N,N'-bis(3,5-di-tert-butyl-salicylidene)-1,2-cyclohexanediamine chromium(III) chloride [Cr(Salen)Cl] and 0.049 mg (0.115 mmoles) of triphenyl(4-pyridinylmethyl)phosphonium chloride hydrochloride (UHFFA) were weighed in a Schlenk flask and, subsequently, 5 ml of dichloromethane (CH$_2$Cl$_2$) were added: the mixture obtained was left, under stirring, at ambient temperature (25° C.), for 1 hour. The solvent was then removed, under vacuum, and 25 ml of cyclohexene oxide were added to the catalytic system obtained: the reaction mixture obtained was left, under stirring, at ambient temperature (25° C.), for 15 minutes and subsequently inserted, under vacuum, into an autoclave at the working temperature of 80° C. Once inserted into the autoclave, the reaction mixture was maintained, under stirring for 2 minutes and, subsequently, carbon dioxide (CO$_2$) was added at a pressure of 30 atm. The polymerization reaction was carried out for 3.5 hours, at the end of which, the pressure inside the autoclave had dropped to 15 atm. Subsequently, the autoclave was cooled to 30° C. and the pressure was brought to 1 atm.

The semisolid viscous solution obtained was collected from the autoclave and purified through dissolution in dichloromethane (CH$_2$Cl$_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Examples 5-9 were carried out operating under the same conditions described above with the only difference being the use of different catalytic systems (i.e. different catalysts and co-catalysts). In particular, Example 5: 0.073 g (0.115 mmoles) of N,N'-bis(3,5-di-tert-butylsalicylidene)-1,2-cyclohexanediamine chromium(III) chloride [Cr(Salen)Cl] and 0.043 g (0.115 mmoles) of tetraphenylphosphonium chloride (TPPCl);

Example 6: 0.073 g (0.115 mmoles) of N,N'-bis(3,5-di-tert-butylsalicylidene)-1,2-cyclohexanediamine chromium(III) chloride [Cr(Salen)Cl] and 0.049 g (0.115 mmoles) of triphenyl(2-pyridinylmethyl)phosphonium chloride hydrochloride (FAO);

Example 7: 0.037 g (0.057 mmoles) of N,N'-bis(3,5-di-tert-butylsalicylidene)-1,2-cyclohexanediamine chromium(III) chloride [Cr(Salen)Cl] and 0.025 g (0.057 mmoles) of triphenyl(4-pyridinylmethyl)phosphonium chloride hydrochloride (UHFFA);

Example 8 (invention): 0.073 g (0.115 mmoles) of N,N'-bis(3,5-di-tert-butyl-salicylidene)-1,2-cyclohexanediamine chromium(III) azide [Cr(Salen)N$_3$] obtained as described in Example 1 and 0.049 g (0.115 mmoles) of triphenyl(4-pyridinylmethyl)phosphonium chloride hydrochloride (UHFFA);

Example 9 (invention): 0.073 g (0.115 mmoles) of N,N'-bis(3,5-di-tert-butyl-salicylidene)-1,2-cyclohexanediamine chromium(III) azide [Cr(Salen)N$_3$] obtained as described in Example 1 and 0.043 g (0.115 mmoles) of tetraphenylphosphonium chloride (TPPCl).

The polycyclohexenecarbonate obtained from each example, was then characterized through (DSC) (Differential Scanning calorimetry) and GPC (Gel Permeation Chromatography): the results obtained are reported in Table 3 wherein they are reported in the following order: the Example number, the type and the amount in mmoles of catalyst, the type and the amount in mmoles of co-catalyst, the polymerization temperature (T) in Celsius degrees, the amount of polymer recovered (yield) in grams, the number average molecular weight (M$_n$) in g/mole, the weight average molecular weight (M$_w$) in g/mole, the polydispersity index (PDI) (M$_w$/M$_n$ ratio) and the glass transition temperature (T$_g$) in Celsius degrees.

TABLE 3

| Example | Catalyst (mmoles) | Co-catalyst (mmoles) | T (° C.) | Yield (g) | $M_n$ (g/mole) | $M_w$ (g/mole) | $M_w/M_n$ | $T_g$ (° C.) |
|---|---|---|---|---|---|---|---|---|
| 4 | Cr(Salen)Cl (0.115) | UHFFA (0.115) | 80 | 17.3 | 11120 | 13010 | 1.17 | 111 |
| 5 | Cr(Salen)Cl (0.115) | TPPCI (0.115) | 80 | 6.2 | 11764 | 22446 | 1.91 | 70 |
| 6 | Cr(Salen)Cl (0.115) | FAO (0.115) | 80 | 12.5 | 10149 | 7717 | 1.22 | 117 |
| 7 | Cr(Salen)Cl (0.057) | UHFFA (0.057) | 80 | 17.1 | 8721 | 19362 | 2.22 | 70 |
| 8 | Cr(Salen)N$_3$ (0.115) | UHFFA (0.115) | 80 | 14.9 | 9060 | 10238 | 1.13 | 119 |
| 9 | Cr(Salen)N$_3$ (0.115) | TPPCI (0.115) | 80 | 7.1 | 4810 | 5510 | 1.15 | 115 |

Examples 10-11

Preparation of Polycyclohexenecarbonate (Constant Pressure)

A 250 ml steel autoclave was sanitized with thorough washing with acetone [(CH$_3$)$_2$O] and anhydrous methanol (MeOH) and subsequently maintained, under vacuum, at 80° C., for 12 hours.

In the meantime, in a dry box, 0.073 g (0.115 mmoles) of N,N'-bis(3,5-di-tert-butyl-salicylidene)-1,2-benzodiamine chromium(III) chloride [Cr(Salaphen)Cl] obtained as described in Example 3 and 0.049 g (0.115 mmoles) of triphenyl(4-pyridinylmethyl)-phosphonium chloride hydrochloride (UHFFA) were weighed in a Schlenk flask and, subsequently, 5 ml of dichloromethane (CH$_2$Cl$_2$) were added: the mixture obtained was left, under stirring, at ambient temperature (25° C.), for 1 hour. The solvent was then removed, under vacuum, and 25 ml of cyclohexene oxide were added to the catalytic system obtained. The reaction mixture obtained was left, under stirring, at ambient temperature (25° C.), for 15 minutes and then inserted, under vacuum, into an autoclave at the working temperature of 80° C. Once inserted into the autoclave, the reaction mixture was maintained, under stirring for 2 minutes and, subsequently, carbon dioxide (CO$_2$) was added at a pressure of 30 atm: the pressure was kept constant through a system of flow meter valves for the whole polymerization duration. The polymerization reaction was carried out for 3.5 hours, at the end of which the autoclave was cooled to 30° C. and the pressure was brought to 1 atm.

The semisolid viscous solution obtained was collected from the autoclave and purified through dissolution in dichloromethane (CH$_2$Cl$_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Example 11 was carried out operating under the same operating conditions with the following differences: use of a different catalytic system (i.e. different catalyst and co-catalyst), co-polymerization temperature, i.e. 120° C. instead of 80° C. In particular:

Example 11: 0.073 g (0.115 mmoles) of N,N'-bis(3,5-di-tert-butylsalicylidene)-1,2-cyclohexanediamine chromium(III) chloride [Cr(Salen)Cl] and 0.049 g (0.115 mmoles) of triphenyl(4-pyridinylmethyl)phosphonium chloride hydrochloride (UHFFA).

The polycyclohexenecarbonate obtained from each example was then characterized through (DSC) (Differential Scanning calorimetry) and GPC (Gel Permeation Chromatography): the results obtained are reported in Table 4 wherein they are reported in the following order: : the Example number, the type and the amount in mmoles of catalyst, the type and the amount in mmoles of co-catalyst, the polymerization temperature (T) in Celsius degrees, the amount of polymer recovered (yield) in grams, the number average molecular weight ($M_n$) in g/mole, the weight average molecular weight ($M_w$) in g/mole, the polydispersion index (PDI) ($M_w/M_n$ ratio) and the glass transition temperature ($T_g$) in Celsius degrees.

TABLE 4

| Example | Catalyst (mmoles) | Co-catalyst (mmoles) | T (° C.) | Yield (g) | $M_n$ (g/mole) | $M_w$ (g/mole) | $M_w/M_n$ | $T_g$ (° C.) |
|---|---|---|---|---|---|---|---|---|
| 10 | Cr(Salaphen)Cl (0.115) | UHFFA (0.115) | 80 | 8.43 | 5590 | 6916 | 1.24 | 116 |
| 11 | Cr(Salen)Cl (0.115) | UHFFA (0.115) | 120 | 7.84 | 7517 | 8368 | 1.11 | 118 |

Examples 12-19

Preparation of Polypropylene Carbonate (Variable Pressure)

A 250 ml steel autoclave was sanitized with thorough washing with acetone [(CH$_3$)$_2$O] and anhydrous methanol (MeOH) and subsequently maintained, under vacuum, at 80° C., for 12 hours.

In the meantime, in a dry box, 0.074 mg (0.115 mmoles) of N,N'-bis(3,5-di-tert-butyl-salicylidene)-1,2-benzodiamine chromium(III) chloride [Cr(Salaphen)Cl] obtained as described in Example 3 and 0.025 mg (0.57 mmoles) of triphenyl(4-pyridinyl-methyl)phosphonium chloride hydrochloride (UHFFA) were weighed in a Schlenk flask and, subsequently, 5 ml of dichloromethane (CH$_2$Cl$_2$) were added: the mixture obtained was left, under stirring, at ambient temperature (25° C.), for 1 hour. The solvent was then removed, under vacuum, and 25 ml of propylene oxide were added to the catalytic system obtained: the reaction mixture obtained was left, under stirring, at ambient temperature (25° C.), for 15 minutes and subsequently inserted, under vacuum, into an autoclave at the working temperature of 80° C. Once inserted into the autoclave, the reaction mixture was maintained, under stirring for 2 minutes and, subsequently, carbon dioxide ($CO_2$) was added at a pressure of 30 atm. The polymerization reaction was carried out for 24 hours, at the end of which, the pressure inside the autoclave had dropped to 18 atm. Subsequently, the autoclave was cooled to 30° C. and the pressure was brought to 1 atm.

The semisolid viscous solution obtained was collected from the autoclave and purified through dissolution in dichloromethane ($CH_2Cl_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Examples 13-16 were carried out operating under the same conditions described above with the only difference being the use of different catalytic systems (i.e. different co-catalysts). In particular, Example 13: 0.074 mg (0.115 mmoles) of N,N'-bis(3,5-di-tert-butyl-salicylidene)-1,2-benzodiamine chromium(III) chloride [Cr(Salaphen)Cl] and 0.022 g (0.057 mmoles) of tetraphenylphosphonium chloride (TPPCl);

Example 14: 0.074 mg (0.115 mmoles) of N,N'-bis(3,5-di-tert-butyl-salicylidene)-1,2-benzodiamine chromium(III) chloride [Cr(Salaphen)Cl] and 0.025 g (0.057 mmoles) of triphenyl(2-pyridinylmethyl)phosphonium chloride hydrochloride (FAO);

Example 15: 0.074 mg (0.115 mmoles) of N,N'-bis(3,5-di-tert-butyl-salicylidene)-1,2-benzodiamine chromium(III) chloride [Cr(Salaphen)Cl] and 0.027 g (0.057 mmoles) of 3-(bromopropyltriphenyl)phosphonium bromide (BTPBr);

Example 16: 0.074 mg (0.115 mmoles) of N,N'-bis(3,5-di-tert-butyl-salicylidene)-1,2-benzodiamine chromium(III) chloride [Cr(Salaphen)Cl] and 0.022 g (0.057 mmoles) of benzyltriphenylphosphonium chloriide (BTPCl);

Example 17: 0.074 mg (0.115 mmoles) of N,N'-bis(3,5-di-tert-butyl-salicylidene)-1,2-benzodiamine chromium(III) chloride [Cr(Salaphen)Cl] and 0.026 g (0.057 mmoles) of 2-(aminobenzyl)triphenylphosphonium bromide (ABPBr);

Example 18: 0.074 mg (0.115 mmoles) of N,N'-bis(3,5-di-tert-butyl-salicylidene)-1,2-benzodiamine chromium(III) chloride [Cr(Salaphen)Cl] and 0.026 g (0.057 mmoles) of (tert-butoxycarbonylmethyl)triphenylphosphonium bromide (BMPBr);

Example 19: 0.074 mg (0.115 mmoles) of N,N'-bis(3,5-di-tert-butyl-salicylidene)-1,2-benzodiamine chromium(III) chloride [Cr(Salaphen)Cl] and 0.024 g (0.057 mmoles) of (3-carboxylpropyl)triphenyl)phosphonium bromide (CPPBr).

The polypropylene carbonate obtained from each example, was then characterized through (DSC) (Differential Scanning calorimetry) and GPC (Gel Permeation Chromatography): the results obtained are reported in Table 5 wherein they are reported in the following order: the Example number, the type and the amount in mmoles of catalyst, the type and the amount in mmoles of co-catalyst, the conversion expressed as a percentage and determined with a NMR spectrum ($^1$H-MNR) on the crude reaction product in order to determine the amount of propylene oxide converted in polypropylene carbonate, the selectivity expressed as a percentage and determined with a NMR spectrum ($^1$H-MNR) on the crude reaction product in order to determine the amount of polypropylene carbonate obtained with respect to the amount of cyclic carbonate, the amount of ether linkages remained in the polypropylene carbonate after its purification expressed as a percentage and determined with a NMR spectrum ($^1$H-MNR), the number average molecular weight ($M_n$) in g/mole, the weight average molecular weight ($M_w$) in g/mole, the polydispersion index (PDI) ($M_w/M_n$ ratio) and the glass transition temperature ($T_g$) in Celsius degrees.

TABLE 5

| Example | Catalyst (mmoles) | Co-catalyst (mmoles) | Conversion (%) | Selectivity (%) | Ether linkages (%) | $M_n$ (g/mole) | $M_w$ (g/mole) | $M_w/M_n$ | $T_g$ (° C.) |
|---|---|---|---|---|---|---|---|---|---|
| 12 | Cr(Salaphen)Cl (0.115) | UHFFA (0.057) | 83 | 59 | 12 | 26660 | 32790 | 1.23 | 35 |
| 13 | Cr(Salaphen)Cl (0.115) | TPPCl (0.057) | 83 | 90 | 5 | 29400 | 33520 | 1.14 | 39 |
| 14 | Cr(Salaphen)Cl (0.115) | FAO (0.057) | 59 | 68 | 16 | 19500 | 20870 | 1.07 | 30 |
| 15 | Cr(Salaphen)Cl (0.115) | BTPBr (0.057) | 60 | 58 | 3 | 14400 | 16270 | 1.13 | n.m. |
| 16 | Cr(Salaphen)Cl (0.115) | BTPCl (0.057) | 39 | 45 | 19 | 13300 | 14100 | 1.06 | n.m. |
| 17 | Cr(Salaphen)Cl (0.115) | ABPBr (0.057) | 10 | 26 | 43 | n.m. | n.m. | n.m. | n.m. |
| 18 | Cr(Salaphen)Cl (0.115) | BMPBr (0.057) | 11 | 53 | 37 | n.m. | n.m. | n.m. | n.m. |
| 19 | Cr(Salaphen)Cl (0.115) | CPPBr (0.057) | 20 | 27 | 38 | n.m. | n.m. | n.m. | n.m. | n.m.: not measured.

The invention claimed is:

1. A process for preparing polycarbonate comprising copolymerizing an epoxy compound and carbon dioxide ($CO_2$) in the presence of a catalytic system comprising:

at least one catalyst selected from complexes of a transition metal having general formula (I):

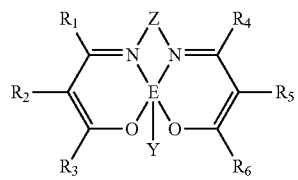
(I)

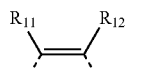
(III)

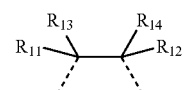
(IV)

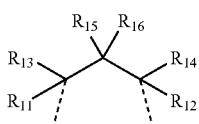
(V)

wherein:
- E represents a metal atom selected from the group consisting of chromium, manganese, iron, cobalt, nickel, and aluminum;
- $R_1$, $R_2$, $R_3$, $R_4$, $R_5$ and $R_6$, identical or different, represent a hydrogen atom or are selected from the group consisting of linear or branched, saturated or unsaturated, $C_1$-$C_{20}$ alkyl groups, optionally containing heteroatoms; optionally substituted aryl groups; optionally substituted heteroaryl groups; optionally substituted cycloalkyl groups; and optionally substituted heterocyclic groups;
- or $R_2$ and $R_3$ and/or $R_5$ and $R_6$, may optionally be linked together to form, together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triarylsilyl groups, dialkyl- or diaryl-amine groups, dialkyl- or diaryl-phosphine groups, linear or branched, saturated or unsaturated $C_1$-$C_{20}$ alkoxy groups, optionally substituted aryloxy groups, optionally substituted thioalkoxy or thioaryloxy groups, and cyano groups, said cycle optionally containing heteroatoms selected from the group consisting of oxygen, sulfur, nitrogen, silicon, phosphorus, selenium, oxygen, and nitrogen;
- Y represents a halogen anion selected from the group consisting of a fluoride anion, a chloride anion, a bromide anion, and an iodide anion an inorganic anion selected from the group consisting of an azide anion, a hydroxide anion, an amide anion, a perchlorate anion, a chlorate anion, a sulfate anion, a phosphate anion, and a nitrate anion or an organic anion selected from the group consisting of a $C_1$-$C_{20}$ alcoholate anion, a $C_1$-$C_{20}$ thioalcoholate anion, a $C_1$-$C_{30}$ carboxylate anion, and a $C_1$-$C_{30}$ alkyl- or dialkyl-amide anion;
- Z represents a divalent organic radical having general formula (III), (IV) or (V):

wherein:
- $R_{11}$, $R_{12}$, $R_{13}$, $R_{14}$, $R_{15}$ and $R_{16}$, identical or different, represent a hydrogen atom; or are selected from the group consisting of linear or branched, saturated or unsaturated $C_1$-$C_{20}$ alkyl groups, optionally containing heteroatoms; optionally substituted aryl groups; optionally substituted heteroaryl groups; optionally substituted cycloalkyl groups; and optionally substituted heterocyclic groups;
- or $R_{11}$ and $R_{12}$ in general formula (III) or in general formula (IV), or $R_{11}$ and $R_{13}$ in general formula (IV), or $R_{11}$ and $R_{15}$ or $R_{11}$ and $R_{16}$ in general formula (V), may optionally be linked together to form together with the other atoms to which they are linked, a saturated, unsaturated or aromatic cycle containing from 1 to 12 carbon atoms, which may optionally be substituted with linear or branched, saturated or unsaturated, $C_1$-$C_{20}$ alkyl groups optionally containing heteroatoms, optionally substituted aryl groups, optionally substituted heteroaryl groups, optionally substituted cycloalkyl groups, optionally substituted heterocyclic groups, trialkyl- or trialyl-silyl groups, dialkyl or diaryl-amine groups, dialkyl- or diaryl-phosphine groups, linear or branched, saturated or unsaturated, $C_1$-$C_{20}$ alkoxyl groups, optionally substituted aryloxy groups, optionally substituted thioalkoxy or thioaryloxy groups, cyano groups, said cycle optionally containing heteroatoms selected from the group consisting of oxygen, sulfur, nitrogen, silicon, phosphorous, and selenium;
- at least one co-catalyst,
- wherein the at least one co-catalyst is triphenyl(4-pyridinylmethyl)phosphonium chloride hydrochloride (UHFFA).

* * * * *